Patented Mar. 15, 1949

2,464,199

UNITED STATES PATENT OFFICE 2,464,199

ALKYLAMINO ALKYL BROMIDES

Robert C. Elderfield, Hastings on Hudson, and Frederick Brody, New York, N. Y., assignors to the United States of America as represented by the Director of the Office of Scientific Research and Development No Drawing. Application April 8, 1946, Serial No. 660,413

3 Claims. (Cl. 260—583)

This invention relates to novel organic compounds and more particularly to alkylaminoalkyl halides and to the preparation thereof.

By this invention there are provided novel monoalkyl-substituted-aminoalkyl halides which may be represented by the following formula

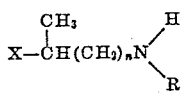

wherein R represents a lower alkyl hydrocarbon radical having from 1 to 6 carbon atoms, X represents a halogen of the class of chlorine and bromine, and $n$ represents 3 or 4; and salts thereof.

Illustrative examples of compounds within the scope of this invention are 1-(N-methylamino)-4-bromopentane hydrobromide, 1-(N-ethylamino)-5-chlorohexane, 1-(N-isopropylamino)-4-chloropentane hydrochloride, 1-(N-sec. butylamino)-5-bromohexane and 1-(N-isoamylamino)-5-bromohexane hydrobromide. Thus referring to the above formula, R may be a lower alkyl radical such as a methyl, ethyl, propyl, isopropyl, a butyl, an amyl, or a hexyl radical, and X a halogen such as chlorine or bromine. These compounds may be prepared in the form of their free bases but desirably are prepared and maintained in the form of their salts, in which form they are more stable.

The compounds of this invention have utility as intermediates in the preparation of antimalarial compounds.

The novel compounds disclosed in this invention may be prepared according to the series of reactions illustrated below

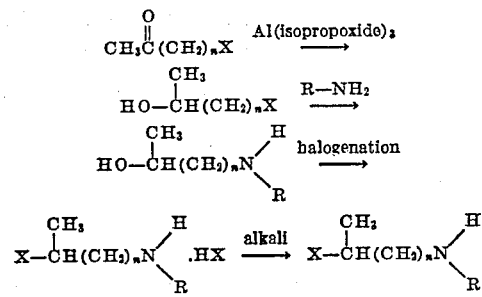

wherein R, X, and $n$ have the same significance as before.

In accordance with the above series of reactions a haloalkanone, for example, 1-chloropentanone-4 or 1-bromo-hexanone-5, is reduced with aluminum isopropoxide to form the corresponding carbinol. The carbinol is then reacted with a primary alkylamine whereby the halogen atom is replaced by the alkylamino group. The resulting alkylaminocarbinol is halogenated, during which process the hydroxy group of the carbinol is replaced by a halogen atom. The alkylaminoalkyl halide thus obtained is in the form of its salt, and from the salt the free amino compound may be obtained by treatment with an alkali such as sodium hydroxide. The hydroxy group of the alkylaminocarbinol intermediate may be replaced by a halogen atom by any of the commonly used methods, such as treatment with a halogen acid, a phosphorus trihalide, or a thionyl halide. It is preferred however that this replacement be effected by means of a thionyl halide.

It is noted that usual methods of synthesis appear to be ineffective to produce the novel compounds as disclosed herein. Thus, for example, if an attempt is made to condense a primary alkylamine with a haloalkanone of the class described, there results a cyclic compound such as substituted $\Delta^2$-pyrroline or a polymeric product. Alternatively, if the synthesis is attempted by first reducing the haloalkanone to the corresponding carbinol which subsequently is to be reacted with the primary amine, it is found that reduction by the means of the usual reducing agents, such as catalytic reduction with Raney nickel or platinum, results in the formation of a cyclic compound. Thus, for example, such catalytic reduction of 1-chloro-pentanone-4 yields 2-methyltetrahydrofurane exclusively. These difficulties have been obviated by the use of aluminum isopropoxide as a reducing agent and reducing conditions such that the reduction is completed as rapidly as possible.

The reactions involved in producing the novel compositions of this invention may be exemplified as follows:

(1) 1-chloro-pentanol-4 represented by the following formula (2)
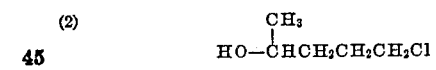

may be prepared from 1-chloro-pentanone-4 in the following manner:

750 ml. of 3-M aluminum isopropoxide solution in substantially dry isopropyl alcohol is heated to boiling, 120.5 g. of freshly distilled 1-chloro-pentanone-4 are added and the mixture is distilled as rapidly as possible. During the distillation isopropyl alcohol is added to the mixture to maintain the volume substantially constant. The reaction is continued for about 45 minutes and the resulting mixture concentrated in vacuo, using a minimum of heat. The residue is poured into a mixture of 300 ml. of concentrated hydrochloric acid and 400 g. of cracked ice and the mixture maintained at a temperature below 50° C. by the addition of more ice. The solution is then filtered and the filtrate extracted with five 400 ml. portions of ether. The combined ether extracts are washed with 100 ml. portions of saturated magnesium sulfate solution until the aqueous washings are neutral. The ether solution is then dried over anhydrous magnesium sulfate and the ether removed in vacuo while maintaining the temperature below about 60° C. The liquid residue is dissolved in an equal volume of anhydrous ether, the solution dried with anhydrous magnesium sulfate, and the ether evaporated in vacuo. The residue comprising 1-chloropentanol-4 is purified by distillation in vacuo.

1-chloropentanol-4 thus prepared boiled at 66–68° C. at about 3 mm. pressure. Analysis showed the presence of 49.5 percent carbon, 8.9 percent hydrogen, and 27.5 percent chlorine as compared with the calculated values of 49.0 percent carbon, 9.0 percent hydrogen, and 28.8 percent chlorine.

1-bromohexanol-5 may be prepared from 1-bromohexanone-5 by the same procedure as outlined above. The 1-bromohexanone-5 used in the preparation may be obtained by reacting the sodium derivative of acetoacetic ester with trimethylene bromide and subjecting the condensation product to ketonic hydrolysis.

(2) 1-(N-isopropylamino)-pentanol-4 represented by the following formula (3)
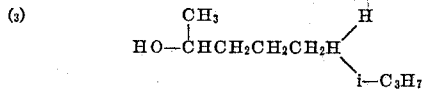

may be prepared from 1-chloropentanol-4 in the following manner:

12.2 g. of 1-chloropentanol-4 and 5.9 g. isopropylamine are mixed and allowed to stand at room temperature for about 4 to 7 days. The reaction mixture is then heated on a steam bath for a short period of time to remove any excess amine and the residue is poured into a mixture of ice and hydrochloric acid. The resulting mixture is extracted twice with ether to remove any unreacted 1-chloropentanol-4. The aqueous solution is then saturated with potassium hydroxide and cooled to about 0° C., whereupon 1-(N-isopropylamino)-pentanol-4 separates as a supernatant layer. The layer of 1-(N-isopropylamino)-pentanol-4 is removed and the aqueous residue extracted with ether to recover the dissolved 1-(N-isopropylamino)-pentanol-4. The ether extracts are added to the separated 1-(N-isopropylamino)-pentanol-4, the mixture dried with potassium hydroxide, the ether evaporated and the residual 1-(N-isopropylamino)-pentanol-4 purified by distillation.

1-(N-isopropylamino)-pentanol-4 thus prepared boiled at about 111–113° C. at about 16 mm. pressure. Analysis showed the presence of 66.0 per cent carbon and 13.0 percent hydrogen as compared with calculated values of 66.2 per cent carbon and 13.2 percent hydrogen.

Additional examples of compounds which may be prepared by the above procedure are: 1-(N-ethylamino)-pentanol-4 which boils at 108–109° C. at about 20 mm. pressure; 1-(N-n-propylamino)-pentanol-4 which boils at 82–84° C. at about 5 mm. pressure; 1-(N-isobutylamino)-pentanol-4 which boils at 122–124° C. at about 20 mm. pressure; 1-(N-tert. butylamino)-pentanol-4 which boils at 109–110° C. at about 16 mm. pressure; and 1-(N-isopropylamino)-hexanol-5, which melts at about 52–53° C.

(3) 1-(N-isopropylamino)-4-bromopentane hydrobromide represented by the following formula:

(4)
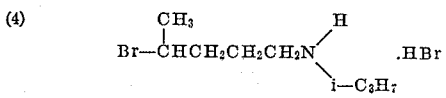

may be prepared as follows:

145 g. of 1-(N-isopropylamino)-pentanol-4 are dissolved in one liter of dry benzene. The benzene solution is maintained at a temperature below 10° C. and 224 g. of thionyl bromide are added with stirring over a period of about 3 hours. The temperature of the mixture is allowed to rise to room temperature and stirring is continued for an additional 3 hours. The benzene is evaporated in vacuo and the residue comprising 1-(N-isopropylamino)-4-bromopentane hydrobromide is recrystallized from a mixture of acetone and ether.

1-(N-isopropylamino)-4-bromopentane hydrobromide thus prepared melts at about 150–152° C. Analysis showed the presence of 35.8 percent carbon and 7.0 percent hydrogen as compared with calculated values of 35.6 percent carbon and 6.9 percent hydrogen.

Additional examples of compounds prepared in accordance with the above procedure are: 1-(N-ethylamino)-4-bromopentane hydrobromide which melts at about 147–148° C.; 1-(N-n-propylamino)-4-bromopentane hydrobromide which melts at about 210–212° C.; 1-(N-isobutylamino)-4-aminopentane hydrobromide which melts at about 235–237° C.; 1-(N-tert. butylamino)-4-bromopentane hydrobromide which melts at about 179–180° C.; and 1-(N-isopropylamino)-5-bromohexane hydrobromide which melts at about 142–143.5° C.

(4) 1-(N-isopropylamino)-4-bromopentane represented by the following formula:

(5)
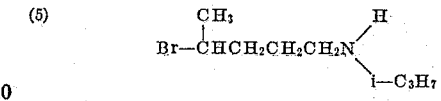

may be prepared from the corresponding hydrobromide salt as follows:

5 g. of 1-(N-isopropylamino)-4-bromopentane hydrobromide are dissolved in 25 cc. of cold water and the solution is treated with an excess of sodium hydroxide solution. The 1-(N-isopropylamino)-4-bromopentane appears as an oily layer, and is separated by extraction with ether. The ether extract is dried over anhydrous potassium carbonate and the ether removed in vacuo, leaving 1-(N-isopropylamino)-4-bromopentane as a faintly colored oil.

We claim as our invention:

1. The compounds represented by the formula

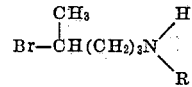

wherein R represents an alkyl group having from 1 to 6 carbon atoms.

2. 1-n-propylamino-4-bromopentane of the formula

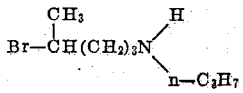

3. 1-isopropylamino - 4 - bromopentane of the formula

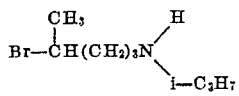

ROBERT C. ELDERFIELD.
FREDERICK BRODY.

REFERENCES CITED

The following references are of record in the file of this patent:

UNITED STATES PATENTS

| Number | Name | Date |
|---|---|---|
| 2,297,147 | Hass et al. | Sept. 29, 1942 |

FOREIGN PATENTS

| Number | Country | Date |
|---|---|---|
| 486,079 | Germany | Sept. 12, 1924 |
| 558,647 | Germany | Sept. 2, 1930 |

OTHER REFERENCES

Braun (1), Ber. deut. chem., vol. 43, p. 2870 (1910).
Mannich et al., Ber. deut. chem., vol. 68B, pp. 273-278 (1935).
Clemo et al., J. Chem. Soc. (London), pp. 608-609 (1936).
Lund, Ber. deut. chem., vol. 70B, pp. 1520-1525 (1937).
Westphal et al., Ber. deut. chem., vol. 73B, pp. 1002-1011 (1940).
Hass and Huffman, J. Am. Chem. Soc., vol. 63, pp. 1233-1235 (1941).
King et al., J. Chem. Soc. (London), p. 401-404 (1942).
Merling (1), Ann., vol. 264, p. 316.
Braun (2), Ann., vol. 382, pp. 1-49.
Merling (2), Ann., vol. 264, p. 338.